United States Patent
Shetty et al.

(10) Patent No.: US 8,270,931 B1
(45) Date of Patent: Sep. 18, 2012

(54) METHODS AND APPARATUS FOR ADJUSTING A RESPECTIVE SEARCH-WINDOW SIZE FOR ONE OR MORE SEARCH WINDOWS FOR A WIRELESS COMMUNICATION DEVICE

(75) Inventors: Manoj Shetty, Overland Park, KS (US); Sachin R. Vargantwar, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 276 days.

(21) Appl. No.: 12/703,299

(22) Filed: Feb. 10, 2010

(51) Int. Cl.
*H04B 1/16* (2006.01)
*H04K 3/00* (2006.01)

(52) U.S. Cl. .............. 455/343.1; 455/434; 455/574

(58) Field of Classification Search .... 455/343.1–343.5, 455/434, 515, 574
See application file for complete search history.

(56) References Cited

U.S. PATENT DOCUMENTS 5,794,146 A * 8/1998 Sevcik et al. ............. 455/434
7,809,411 B2 * 10/2010 Arimitsu ................... 455/574

* cited by examiner

*Primary Examiner* — Lee Nguyen (57) ABSTRACT

Methods and apparatus are provided for a wireless communication device (WCD) to adjust a respective search-window size for one or more search windows. In an embodiment, the WCD monitors a battery power level of a WCD. The WCD then adjusts a respective search-window size of one or more search windows of a WCD based on at least the battery power level. In another embodiment, the WCD monitors a WCD's battery power level and the strength of one or more signals in an active set. The WCD 102 then adjusts a respective search-window size of one or more search windows based on at least the battery power level and the strength of one or more active-set signals.

21 Claims, 6 Drawing Sheets

METHODS AND APPARATUS FOR ADJUSTING A RESPECTIVE SEARCH-WINDOW SIZE FOR ONE OR MORE SEARCH WINDOWS FOR A WIRELESS COMMUNICATION DEVICE

BACKGROUND

Many people use wireless communication devices (WCDs), such as cell phones and personal digital assistants (PDAs), to communicate with cellular wireless networks. These WCDs and networks typically communicate with each other over a radio-frequency (RF) air interface according to a wireless communication protocol such as Code Division Multiple Access (CDMA), perhaps in conformance with one or more industry specifications such as IS-95 and IS-2000. Wireless networks that operate according to these specifications are also referred to as "1×RTT (1×) networks," which stands for "Single Carrier Radio Transmission Technology". These networks (referred to herein as "CDMA networks") typically provide communication services such as voice, Short Message Service (SMS) messaging, and packet-data communication.

Typical CDMA networks include a plurality of base stations, each of which provide one or more wireless coverage areas, such as cells and sectors. As a general matter, sectors are used herein as examples of wireless coverage areas. When a WCD is positioned in a sector, it can communicate over the RF air interface with the base station, and, in turn, over one or more circuit-switched and/or packet-switched signaling and/or transport networks to which the base station provides access. The base station and the WCD conduct these communications over a frequency known as a carrier.

In a typical wireless network, a WCD maintains different base-station-signal sets that typically include an active set, a candidate set, a neighbor set, and a remaining set. At a given time, the active set comprises one or more "active" sectors or coverage areas that are being used to maintain a call for the WCD. The WCD receives substantially the same information from each of the coverage areas in the active set and, on a frame-by-frame basis, selects the best signal to use. The candidate set comprises sectors that are not presently assigned to a call, but are strong enough to be used for a call. The neighbor set comprises sectors having signals that could be received with sufficient strength to enable successful communication. The remaining set comprises sectors the WCD is in communication with that are not in the active, candidate or remaining sets. The WCD, one or more base stations, and/or a base station controller maintains in memory a list of the coverage areas in the WCD's base-station-signal sets.

In existing systems, a link from the base station to the WCD is called a forward link and a link from the WCD to the base station is called a reverse link. In order to facilitate a determination of which sectors should be in the WCD's active and neighbor set, all base stations emit a pilot signal to convey a pseudorandom number (PN) offset that identifies a given sector. A WCD constantly measures the strength of each pilot signal that it receives, and notifies at least one base station when pilot strength for various coverage areas falls above or below designated thresholds. The base station, may, in turn, provide the WCD with updated lists of the sectors in the various base-station-signal sets.

OVERVIEW

In current implementations, a base station provides a WCD with a search window to search for pilot signals. A search window is the amount of time, in terms of chips, that a WCD will search for a pilot, where a chip is the unit of code spreading for CDMA (one chip is approximately 0.8 μs in duration). When the WCD is initially connected to the base station, the base station transmits a search-window size to the WCD. A WCD utilizes a single search window (having that search-window size) to detect a signal for each of the various signal sets on a continuous basis. Specifically, the WCD utilizes relatively large search windows to account for multipath effects and large distances between a base station and the WCD.

The presently disclosed methods and apparatus come, at least in part, from a recognition that conventional methods for detecting signals using relatively large search windows do not optimize battery power. For example, when signal strength is strong and/or multipath effects are minimal, then using a relatively large search window size is not necessary in order to maintain call quality.

To address the limitations of a conventional single, large search window, disclosed herein are methods and apparatus for adjusting a respective search-window size for one or more search windows for a WCD. For example, a search-window size of one or more search windows may be adjusted based on at least the battery power level. Alternatively, a search-window size of one or more search windows may be adjusted further based on the strength of one or more active-set signals. And other implementations are disclosed and contemplated as well.

In general, a larger search-window size requires more battery power. And when signal strength is good the search-window size can be reduced and still remain effective So adjusting the search-window size based on the battery power level serves to enhance battery life without sacrificing call quality.

BRIEF DESCRIPTION OF DRAWINGS

Various exemplary embodiments are described herein with reference to the following drawings, wherein like numerals denote like entities.

DETAILED DESCRIPTION OF EXEMPLARY EMBODIMENTS

1. Exemplary Architecture

Figure 1:
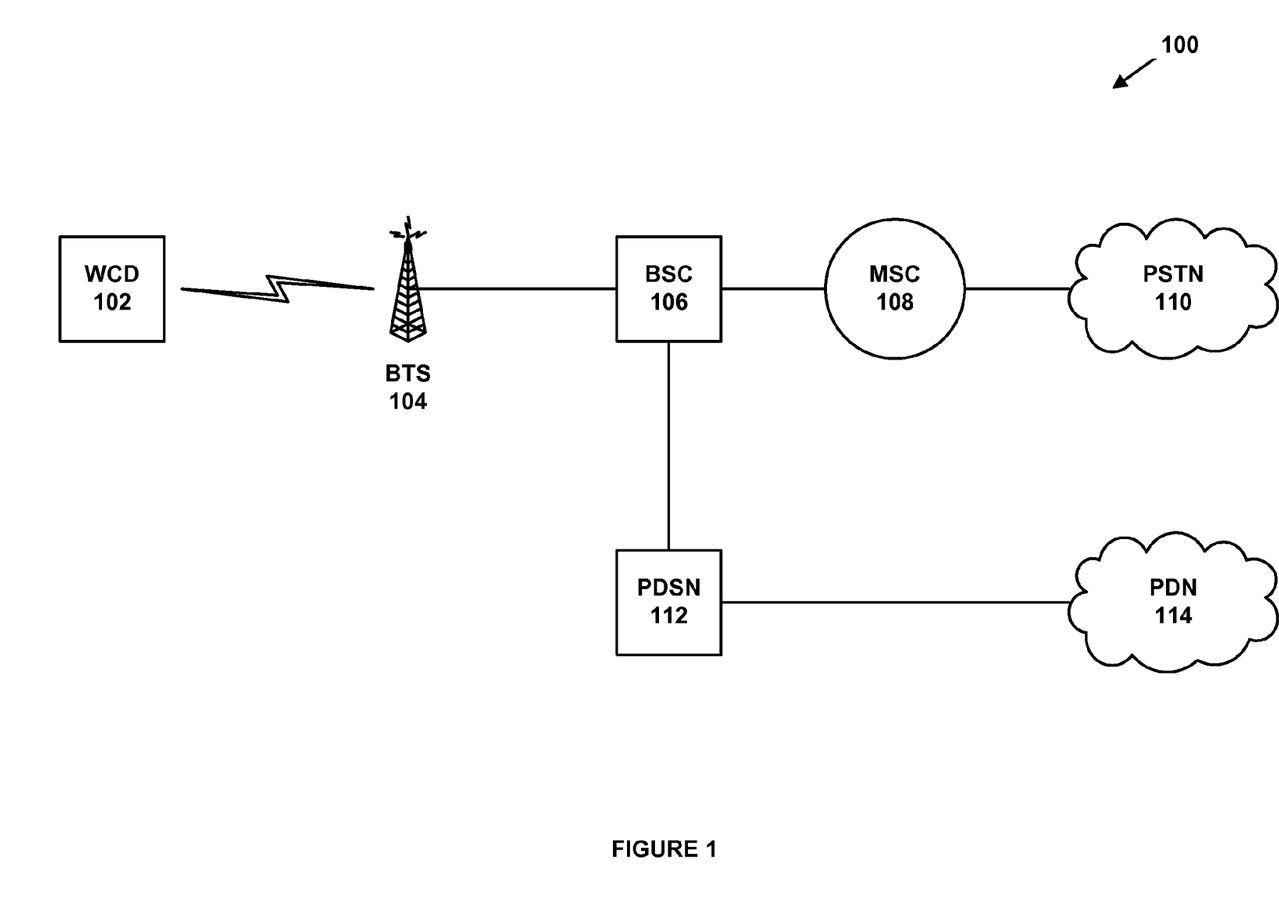
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a WCD 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present, such as additional WCDs in communication with BTS 104, additional BTSs in communication with BSC 106, and additional BSCs in communication with MSC 108, etc.; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

WCD 102 may be any mobile device arranged to carry out the mobile-station functions described herein. As such, WCD 102 may include a user interface, a wireless-communication interface, a processor, and data storage comprising instructions executable by the processor for carrying out those WCD functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, WCD 102 could be or include a cell phone, a PDA, a computer, a laptop computer, a hybrid CDMA/EV-DO device, and/or a multi-mode cellular/Wi-Fi device.

Note that the combination of BTS 104 and BSC 106 may be considered—and referred to herein as—a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA (and/or other protocol) coverage areas such as cells and sectors, for communicating with WCDs, such as WCD 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between WCDs and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between WCDs and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

2. Exemplary Operation

Figure 2:
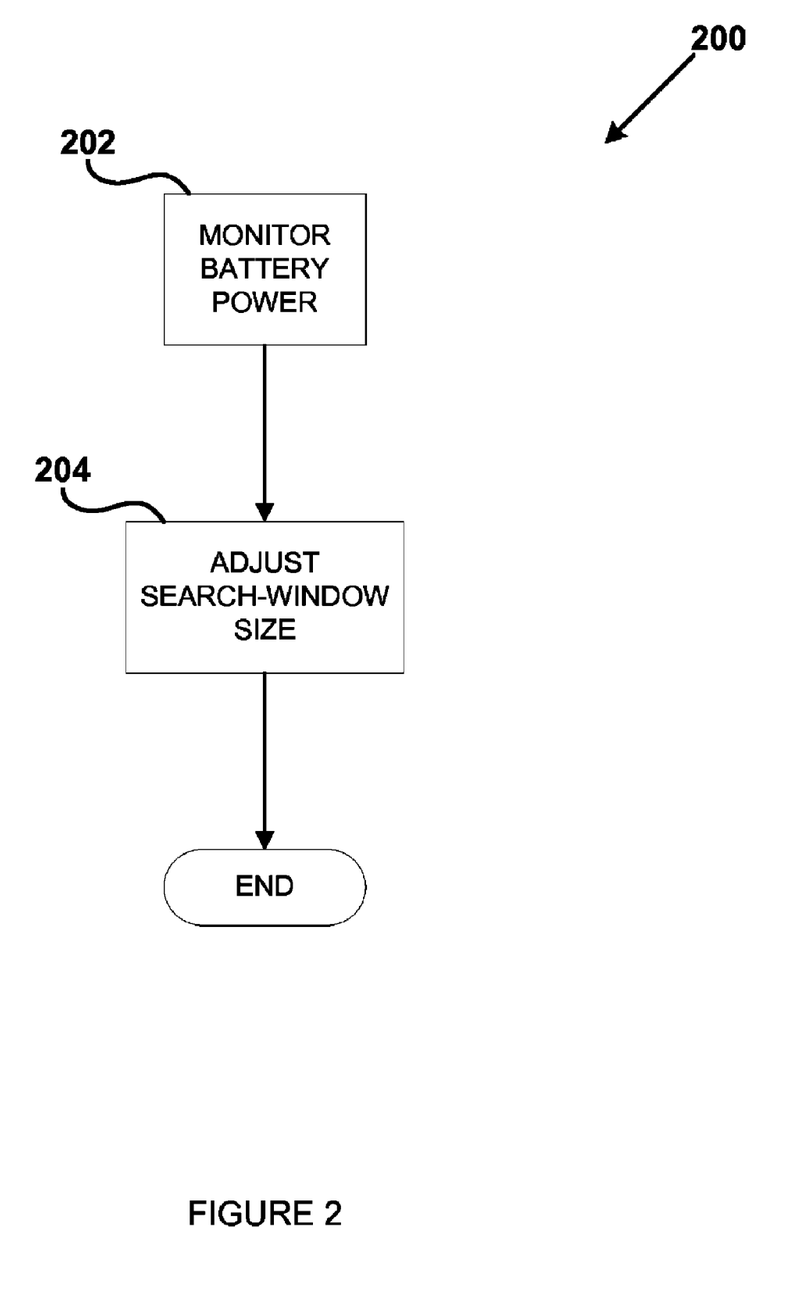
FIG. 2 is a flowchart of a method, in accordance with exemplary embodiments.

FIG. 2 depicts a flowchart of method 200 for adjusting a respective search-window size for one or more search windows for a WCD, in accordance with exemplary embodiments. As shown in FIG. 2, method 200 begins at step 202, where the WCD 102 monitors its battery power level. And at step 204, the WCD 102 adjusts a respective search-window size of one or more search windows based on at least the battery power level.

In CDMA networks, data is transmitted from the BTS 104 to the WCD 102 (and vice versa) in data units that are known as frames, which typically last 20 ms. And method 200 is preferably carried out repeatedly on a periodic basis, for example, every 3000 frames (roughly every minute), so as to dynamically and iteratively adjust a respective search-window size of the one or more search windows as the battery power level changes. When the battery power drains below a given power threshold, the method may be carried out more frequently, for example, in each of a plurality of successive frames. In other embodiments, the battery power draining below a given power threshold may cause WCD 102 to carry out the method less frequently, in order to conserve remaining battery power.

Figure 3:
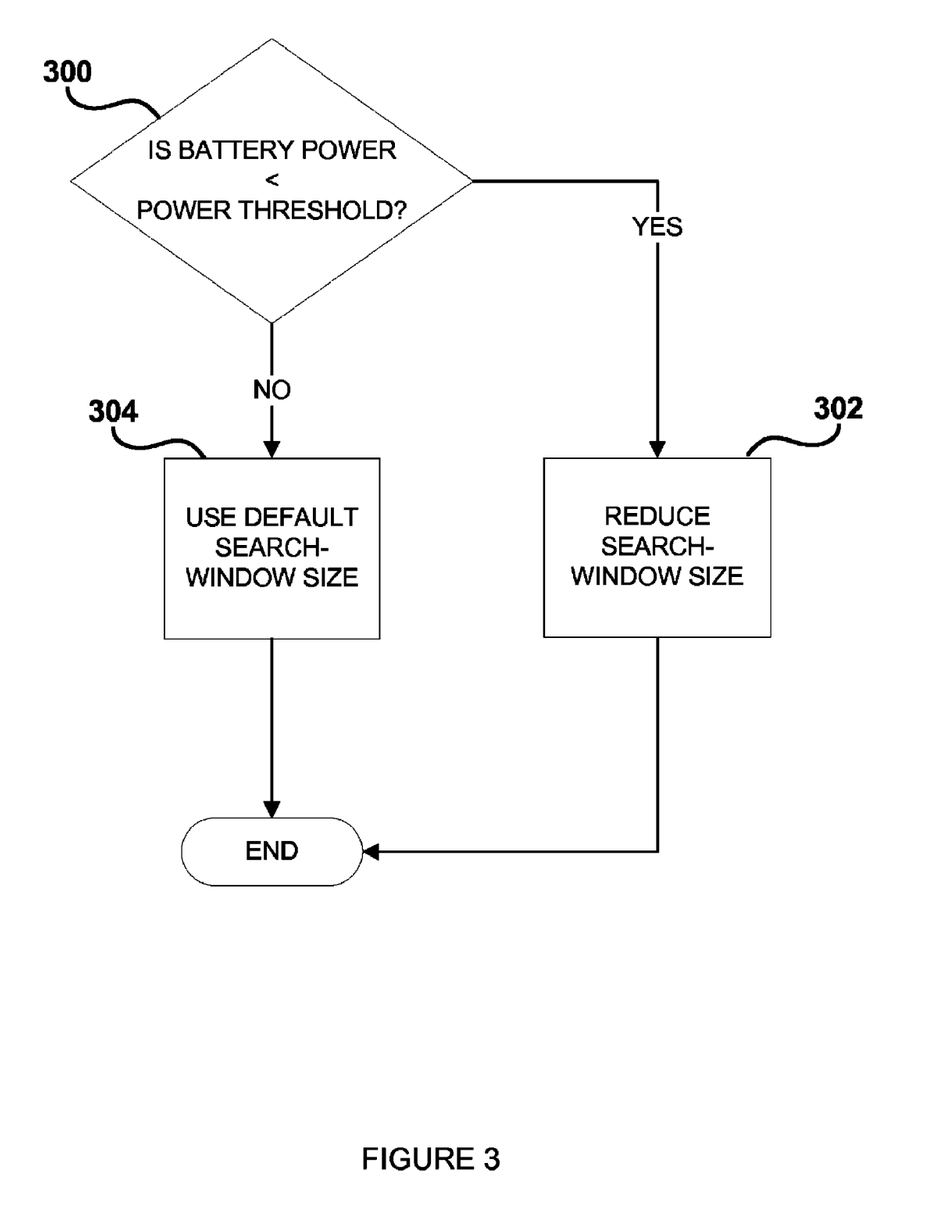
FIG. 3 is a flowchart depicting a function that can be carried out in accordance with an embodiment of the invention.
Figure 4:
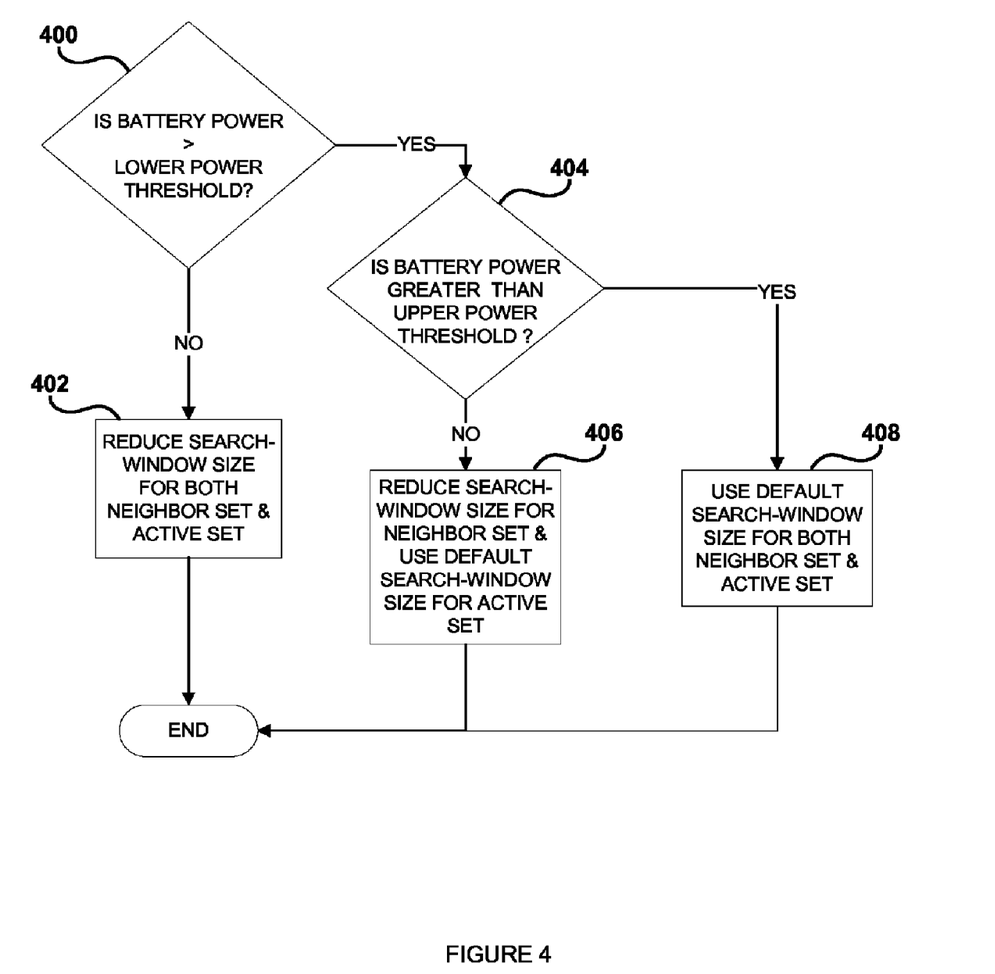
FIG. 4 is a flowchart depicting a function that can be carried out in accordance with an embodiment of the invention.

FIGS. 3-4 are flowcharts depicting a set of functions that can be carried out in accordance with various embodiments. Generally, FIGS. 3-4 depict different embodiments of the WCD 102 carrying out step 204 of FIG. 2.

As shown in the embodiment of FIG. 3, the WCD 102 determines (at 300) whether the battery power level is less than a power threshold. If the battery power level is less than the power threshold, then the WCD 102 (at 302) uses a reduced search-window size for one or more search windows. And if the battery power level exceeds the power threshold, then the WCD (at 304) uses a default search-window size for one or more search windows.

In the foregoing embodiment, the power threshold may range from 5 to 50 percent of battery power. Also, the default search-window size may range from 60 to 100 chips, while the reduced search-window size may range from 30 to 40 chips. And certainly numerous other examples are possible.

FIG. 4 depicts an embodiment where the WCD 102 determines (at 400) whether the battery power level is greater than a lower power threshold. If the battery power level is not greater than the lower power threshold, then the WCD 102 (at 402) uses reduced search-window sizes for both the neighbor-set search window and the active-set search window. Alternatively, if the battery power level is greater than the lower power threshold, the WCD 102 determines (at 404) whether the battery power level is greater than an upper power threshold. If the battery power level is not greater than the upper power threshold, then the WCD 102 (at 406) uses the reduced search-window size for the neighbor-set search window and uses a default search-window size for the active-set search window. If the battery power level is greater than the upper power threshold, then the WCD 102 (at 408) uses default search-window sizes for both a neighbor-set search window and an active-set search window.

In the foregoing embodiment, the upper power threshold may range from 26 to 50 percent of battery power, and the lower power threshold may range from 10 to 25 percent of batter power. And certainly numerous other examples are possible.

In one embodiment, the reduced search-window size for the neighbor set may be smaller when the battery power level is less than the lower power threshold than when the battery power level is between the upper and lower power thresholds. For example, the reduced search-window size for the neighbor set may range from 20 to 30 chips when the battery power level is less than the lower power threshold, and the reduced search-window size for the neighbor set may range from 30 to 40 chips when the battery power level is between the upper and lower power thresholds. Similarly, the reduced search-window size for the active set may be larger than the reduced search-window size for the neighbor set when the battery power level is less than the lower power threshold. And the reduced search-window size for the active set may range from 30 to 40 chips, as but one example.

Figure 5:
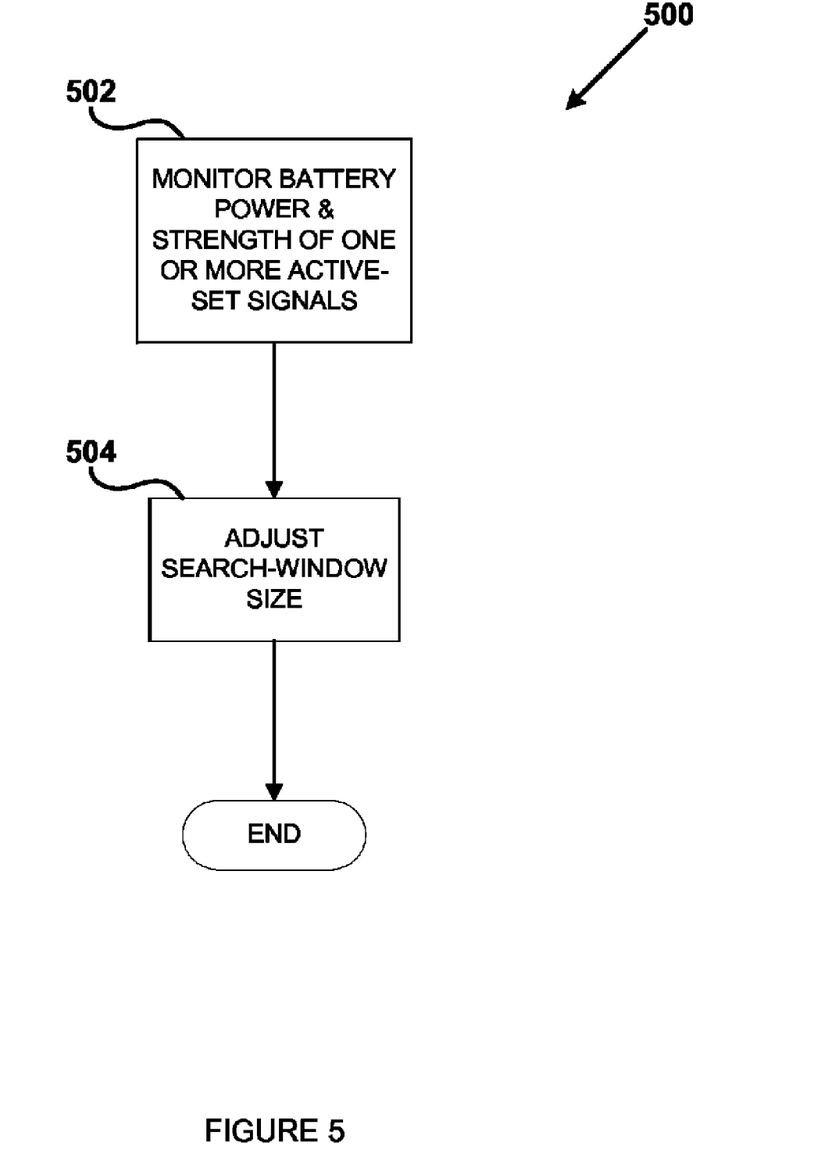
FIG. 5 is a flowchart of a method, in accordance with exemplary embodiments.

FIG. 5 depicts a flowchart of method 500 for adjusting a respective search-window size for one or more search windows for a WCD, in accordance with exemplary embodiments. As shown in FIG. 5, method 500 begins at step 502, where the WCD 102 monitors its battery power level and the strength of one or more signals in its active set. And at step 504, the WCD 102 adjusts a respective search-window size of one or more search windows based on at least the battery power level and the strength of one or more active-set signals.

Figure 6:
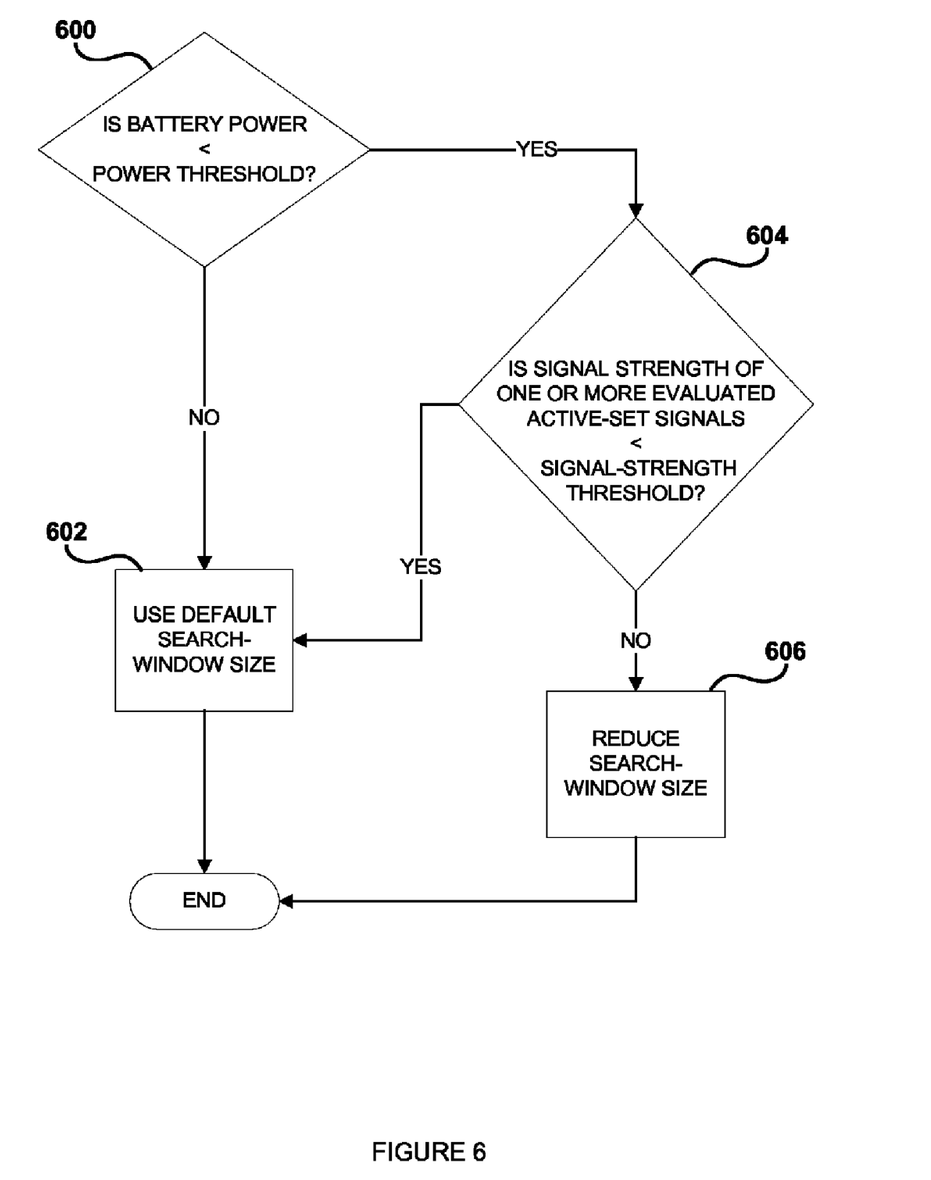
FIG. 6 is a flowchart depicting a function that can be carried out in accordance with an embodiment of the invention.

FIG. 6 is a flowchart depicting a set of functions that can be carried out in accordance with various embodiments. Generally, FIG. 6 depicts an embodiment of the WCD 102 carrying out step 504 of FIG. 5.

As shown in the embodiment of FIG. 6, the WCD 102 determines (at 600) whether the battery power level is less than a power threshold. If not, then the WCD 102 (at 602) uses default search-window sizes for one or more search windows. Alternatively, if the battery power level is less than the power threshold, then the WCD 102 (at 604) determines whether the strength of one or more active-set signal is less than a signal-strength threshold. If so, then the WCD 102 (at 602) uses default search-window sizes for one or more search windows. Otherwise, if the strengths of all evaluated active-set signals exceed the signal-strength threshold, then the WCD 102 (at 606) uses reduced search-window sizes for one or more search windows.

Note that in step 604, the WCD 102 may evaluate any combination of one or more active-set signals. For example, the WCD 102 may evaluate only the strongest active-set signal, or perhaps the three strongest active-set signals, or perhaps all of the active-set signals, or possibly the three weakest active-set signals, or the weakest half of all active-set signals, or the weakest active-set signal. And the signal-strength threshold may be greater than or equal to −12 dB, though of course many different values could be used.

The foregoing methods and embodiments may be carried out for any one or more of the active set, the candidate set, the neighbor set, and the remaining set.

3. Conclusion

Various exemplary embodiments have been described above. Those skilled in the art will understand, however, that changes and modifications may be made to those examples without departing from the scope of the claims.

We claim:

1. A method for adjusting a respective search-window size for one or more search windows for a wireless communication device (WCD), the method comprising:
monitoring a WCD's battery power level;
adjusting a respective search-window size of one or more search windows of the WCD based on at least the battery power level;
wherein adjusting the respective search-window size of the one or more search windows comprises:
(1) determining whether the battery power level is greater than a lower power threshold;
(2) if the battery power level is not greater than the lower power threshold, then using reduced search-window sizes for both a neighbor-set search window and an active-set search window; and
(3) if the battery power level is greater than the lower power threshold,
(a) then determining whether the battery power level is greater than an upper power threshold;
(b) if the battery power level is not greater than the upper power threshold, then using a reduced search-window size for the neighbor-set search window and using the default search-window size for the active-set search window; and
(c) if the battery power lever is greater than the upper power threshold, then using default search-window sizes for both the neighbor-set search window and the active-set search window.

2. The method of claim 1, wherein the reduced search-window sizes are in the range of 30 to 40 chips.

3. The method of claim 1, wherein the default search-window sizes are in the range of 60 to 100 chips.

4. The method of claim 1, wherein the upper power threshold is in the range of 26 to 50 percent of battery power, and wherein the lower power threshold is in the range of 10 to 25 percent of battery power.

5. The method of claim 1, wherein the upper power threshold is 50 percent of battery power.

6. The method of claim 1, wherein the lower power threshold is 25 percent of battery power.

7. The method of claim 1, wherein the reduced search-window size for the neighbor set is smaller when the battery power level is less than the lower power threshold than when the battery power level is between the upper and lower power thresholds.

8. The method of claim 7, wherein the reduced search-window size for the neighbor set is in the range of 20 to 30 chips when the battery power level is less than the lower power threshold, and wherein the reduced search-window size for the neighbor set is in the range of 30 to 40 chips when the battery power level is between the upper and lower power thresholds.

9. The method of claim 1, wherein the reduced search-window size for the active set is larger than the reduced search-window size for the neighbor set when the battery power level is less than the lower power threshold.

10. The method of claim 1, wherein the reduced search-window size for the active set is in the range of 30 to 40 chips.

11. The method of claim 1, wherein the method is carried out repeatedly, once every fixed period of time.

12. The method of claim 11, further comprising decreasing the fixed period of time when battery power is low.

13. The method of claim 11, further comprising increasing the fixed period of time when battery power is low.

14. A method for adjusting a respective search-window size for one or more search windows for a wireless communication device (WCD), the method comprising:
 monitoring a WCD's battery power level;
 adjusting a respective search-window size of one or more search windows of the WCD based on at least the battery power level;
 monitoring a strength of one or more active-set signals, wherein adjusting the search-window size of the one or more search windows is further based on the strength of an evaluation set of one or more of the active-set signals associated with the monitored strengths;
 wherein adjusting the respective search-window size of one or more search windows comprises:
 (1) determining whether the battery power level is less than a power threshold;
 (2) if the battery power level is not less than the power threshold, then using default search-window sizes for the one or more search windows; and
 (3) if the battery power level is less than the power threshold,
  (a) then determining whether the strength of each active-set signal in the evaluation set is less than a signal-strength threshold;
  (b) if the strength of the each active-set signal in the evaluation set is less than the signal-strength threshold, then using default search-window sizes for the one or more search windows; and
  (c) if the strength of each active-set signal in the evaluation set is not less than the signal-strength threshold, then using reduced search-window sizes for the one or more search windows.

15. The method of claim 14, wherein the evaluation set consists of the strongest monitored signal in the active set.

16. The method of claim 14, wherein the evaluation set consists of all monitored signals in the active set.

17. The method of claim 14, wherein the evaluation set consists of the three weakest monitored signals in the active set.

18. The method of claim 14, wherein the evaluation set consists of the weakest half of all the monitored signals in the active set.

19. The method of claim 14, wherein the evaluation set consists of the weakest monitored signal in the active set.

20. The method of claim 14, wherein the signal-strength threshold is greater than or equal to −12 dB.

21. A wireless communication device (WCD) arranged to be able to adjust a respective search-window size for one or more search windows, the WCD comprising:
 a wireless-communication interface;
 a processor; and
 data storage containing program instructions executable by the processor for:
 (i) monitoring a battery power level of the WCD; and
 (ii) adjusting a respective search-window size of one or more search windows of the WCD based on at least the battery power level
 wherein adjusting the respective search-window size of the one or more search windows comprises:
 (1) determining whether the battery power level is greater than a lower power threshold;
 (2) if the battery power level is not greater than the lower power threshold, then using reduced search-window sizes for both a neighbor-set search window and an active-set search window; and
 (3) if the battery power level is greater than the lower power threshold,
  (a) then determining whether the battery power level is greater than an upper power threshold;
  (b) if the battery power level is not greater than the upper power threshold, then using a reduced search-window size for the neighbor-set search window and using the default search-window size for the active-set search window; and
  (c) if the battery power lever is greater than the upper power threshold, then using default search-window sizes for both the neighbor-set search window and the active-set search window.

* * * * *